United States Patent [19]
Boothman et al.

[11] 3,845,354
[45] Oct. 29, 1974

[54] SOLID STATE THERMAL OVERLOAD INDICATOR

[75] Inventors: David Richard Boothman, Ennismore, Ontario; David Walter Nutt, Peterborough, Ontario, both of Canada

[73] Assignee: Canadian General Electric Company, Limited, Toronto, Ontario, Canada

[22] Filed: May 21, 1973

[21] Appl. No.: 362,047

[52] U.S. Cl. ......... 317/13 B, 317/13 A, 317/36 TD, 317/40 R, 317/33 R
[51] Int. Cl. ...................... H02h 7/08, H02h 7/085
[58] Field of Search ........... 317/13 A, 13 B, 36 TD, 317/38, 40 R, 33 R

[56] References Cited
UNITED STATES PATENTS

| | | | |
|---|---|---|---|
| 3,643,130 | 2/1972 | Liska | 317/40 R |
| 3,660,718 | 5/1972 | Pinckaers | 317/40 R |
| 3,742,303 | 6/1973 | Dageford | 317/13 A |

Primary Examiner—J. D. Miller
Assistant Examiner—Patrick R. Salce
Attorney, Agent, or Firm—James H. Beusse; Harold H. Green, Jr.

[57] ABSTRACT

A solid state overload indicator of the inverse-operating characteristic type which is more mindful of the electrical thermal characteristics of the load as it is heated. According to the embodiment disclosed for a motor load and having an independently adjustable stall operating time and running overload trip level, the indicator has analog means, for the thermal resistance and capacitance of the copper in the motor for accounting for the heat energy stored in the motor, connected between one DC bus, and a conductor. Voltage-sensitive indicating means is connected to the conductor for producing an indication for a particular voltage thereon, corresponding to the minimum excessive load temperature. First and second voltage-dependent current valves are each connected between the conductor and the other bus and to current-to-voltage transducers connected in the lines to the motor whereby the voltage on the conductor is a function of the motor current subject to the capacitance and equal to the particular voltage for each value of current after a time according to the indicator characteristic has elapsed. The first and second current valves are adjustable for presetting the trip level and the stall time respectively; the second current valve is on only for overloads greater than some value of overload between the stall and running overloads so that the two can be present independently of each other.

9 Claims, 3 Drawing Figures

SOLID STATE THERMAL OVERLOAD INDICATOR

BACKGROUND OF THE INVENTION

This invention relates to overload indication and, more specifically, to an overload indicator of the inverse-operating characteristic type which is more mindful of the electrical thermal characteristics of the load on heating it.

Load overheating from electrical resistance or I²R type losses is of particular concern for motor and other loads since the overheating increases generally as the square of the current thereto. Over the years, then, replica devices have been developed which have operating characteristics resembling the thermal characteristics - commonly illustrated by thermal damage or safe operating time versus overcurrent curves - of the load and are used for disconnecting the load usually before damage is done to it (or the safe time has elapsed) for all values of overload. What is meant by safe operating time at any overload is essentially that time at which thermal strain on the load becomes great enough that the manufacturer is no longer willing to warrant normal load life; in other words, such abuse will shorten the life of the load by an amount not exactly calculable, but enough that he is unwilling to warrant the application for normal service life.

Electromechanical overload relays are replica devices commonly used for protecting a load. Such relays often comprises a bimetal element associated with a pair of contacts and a heater element, powered directly by the current to the load, or from a current transformer connected in the load circuit, for heating the bimetal element in accordance with that current. With the contacts connected in the power lines to the load, as the bimetal element is overheated the load will be disconnected from the lines. One desirable feature in such relays is their ability to remember and account for in their operating time electrical thermal loss from previous adverse overloads which do not cause the load to be disconnected; this inherent memory ability is of course due to the characteristics of the bimetal element. In the case of short cyclical overloads which do not cause the load to be disconnected, then, the relay will operate faster for each succeeding overload due to the heat stored in the bimetal element. This feature is desirable since it accounts for the fact that an already warm load is more easily strained thermally for any overload.

Unfortunately the bimetal element type of relay does not trace the overloads as accurately as is required in some instances. In motor installations where starting times are long, the bimetal element often is heated sufficiently after the motor has started to erroneously disconnect the motor. This is known as overshoot; conversely the failure of the bimetal element to respond quickly to overloads is known as lag. While these disadvangages are of little consequence in some applications, for some motor installations, they have necessitated shorting the relay for up to 10 seconds on starting so as to extend the relay's operating time to account for overshoot. However, the relay often still overshoots. Although the solution might appear to be to short out the relay for as long as is necessary to prevent overshoot, it is commonly felt that shorting it out for longer than 10 seconds will unduly endanger the motor in the event that it stalls. Effectively, then, the overload-relay type of replica device cannot itself provide adequate stall-running overload protection in all applications; it, of course, cannot be preset to trip for particular stall times and running overcurrent levels either.

Consequently, over the last few years static overload circuits have been developed to replace the overload relay; none are known, however, which imitate the inherent memory ability of the relay for accounting for actual load heating. One such circuit is covered in Canadian Patent No. 795,485 issued Sept. 24, 1968 to T. R. Kelley et al. That circuit consists essentially of a capacitor which is charged, beginning at a certain overload, by a current which is proportional to the overload and which is discharged completely, when the voltage across it reaches a predetermined level, for actuating a circuit breaker. Hence it is basically an electronic timing circuit. Other representative circuits which are essentially, although not specifically, the same as the one in the above-mentioned patent are covered in Canadian Patent No. 802,471 issued Dec. 24, 1968 to J. W. Lipnitz and U.S. Pat. No. 3,602,771 issued Aug. 31, 1971 to D. C. W. Walstad et al. In addition, no static overload circuits are known whose inverse operating characteristic is continuous, like the electromechanical overload relay's is, and yet whose operating time can be preset for one or more values of overload.

Accordingly, it is an object of this invention to provide a solid state overload indicator having an analog of the electrical thermal characteristics of the load so that its operating characteristic more closely resembles the load's thermal damage curve.

The present invention provides such an indicator which for a motor load has independently adjustable stall operating time and running overload trip level, and which consists essentially of a pair of DC buses; a conductor; analog means for the thermal resistance and capacitance of the copper in the motor for accounting for the heat energy stored in the motor copper connected between one bus and the conductor; means for producing a voltage proportional to the current; voltage-sensitive indicating means connected to the conductor which produces an indication for a particular voltage thereon; and first and second voltage-dependent current valves each connected between the conductor and the other bus and to the voltage-producing means whereby the voltage on the conductor is a function of the motor current subject to the capacity and equal to the particular voltage for value of current after a time according to the indicator characteristic has elapsed, the first and second current valve being adjustable for presetting the level for running overloads and the stall time respectively and the second current valve assisting the first current valve only for motor currents greater than some value of motor current between the stall and running motor currents so that the running overload operating level and stall trip time can be preset independent of each other.

This invention will be better appreciated after a reading of the following description made in conjunction with the appended drawings in which.

DESCRIPTION OF THE PREFERRED EMBODIMENT

Figure 1:
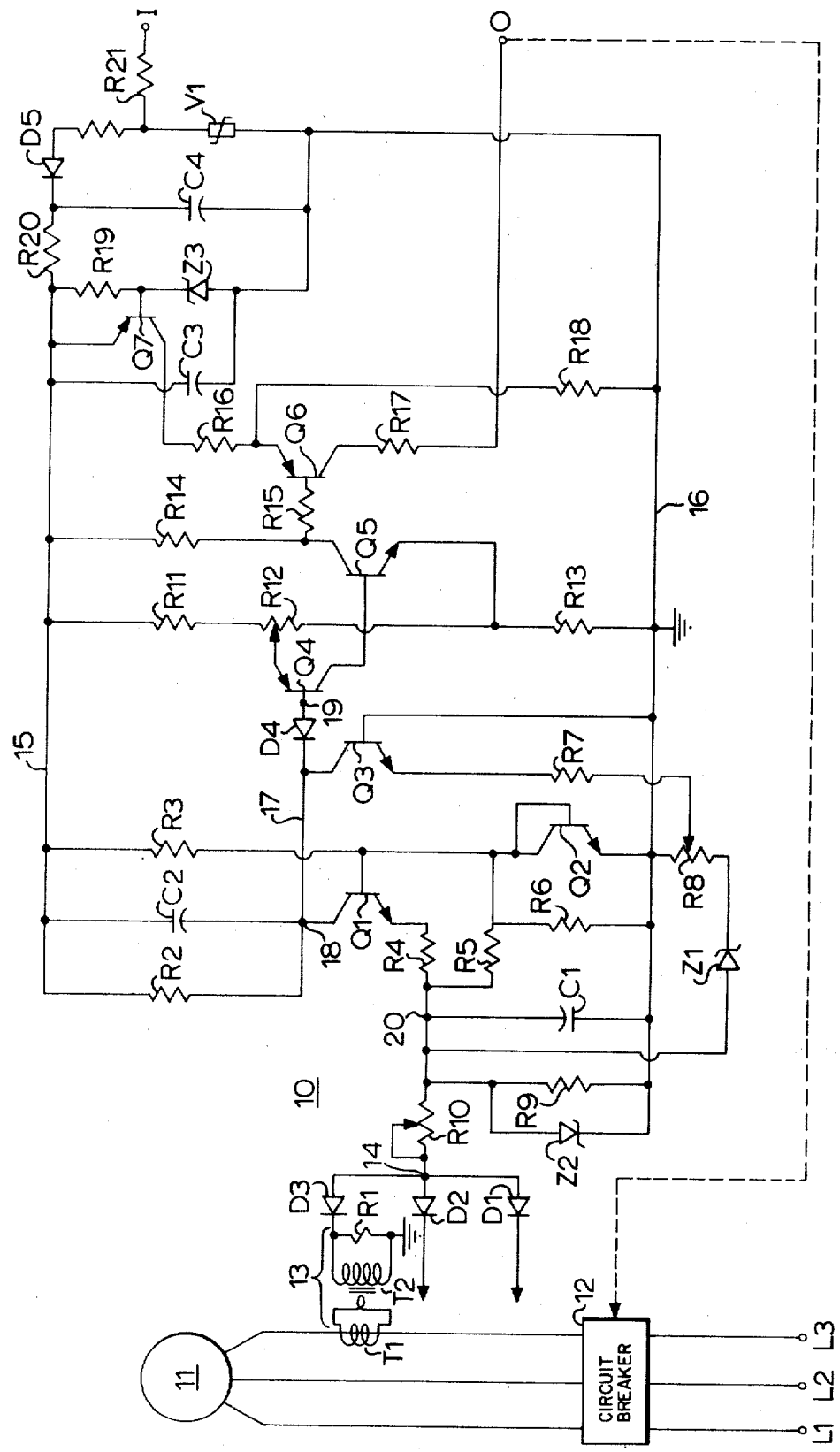
FIG. 1 is a circuit diagram of an indicator according to the invention for a motor load.

In FIG. 1 the overload indicator 10 is shown for a motor load 11. The indicator can, of course, be used as shown therein or modified as required for any load having an inverse thermal damage curve. In FIG. 1 the motor is connected to three phase lines L1, L2 and L3 in which a circuit breaker 12 is connected. A current-into-voltage transducer 13 (only one of which is shown) is connected in each line and to point 14 through diodes D1, D2 and D3. The voltage at point 14 and across capacitor C1 is therefore proportional to the maximum negative current to the load in any of lines L1 through L3. Besides the transducers, the indicator consists of the following specific components connected between DC buses 15 and 16, from another power source input to terminal l, and conductor 17 as shown in the drawing: thermal analog means for the motor which accounts for the electrical resistance or $I^2R$ loss of the motor and consists of resistor R2 and capacitor C2; a first voltage-dependent current valve consisting generally of transistors Q1 and Q2 and resistors R3 through R6 and R10; a second voltage-dependent current valve consisting generally of transistor Q3, resistors R7 and R8 and zener diode Z1; and voltage-sensitive indicating circuitry for producing a signal at terminal O when the time to trip has been reached for tripping circuit breaker 12 and consisting of transistors Q4 through Q6, resistors R11 through R18, and diode D4. The arrangement of transistor Q7, resistors R19 through R21, capacitors C3 and C4, diode D5, zener diode Z3 and varistor V1 generally cooperate to prevent a trip signal from being produced at terminal O when the power input to terminal l is lost.

The parallel arrangement of resistor R2 and capacitor C2 is an electrical analog having characteristics similar to the thermal characteristics of conductors in the motor load or some other similar load. With resistor R2 and capacitor C2 simulating the thermal resistance and capacitance respectively of the copper in the load, then the current to the arrangement is representative of the watts of heat energy in the copper in the load or the electrical thermal or copper loss therof. Provided that buses 15 and 16 are from a power source other than the one supplying the load, the arrangement will roughly approximate the thermal characteristics of the motor on cooling. It will soon be more readily apparent that this arrangement electronically accounts for the electrical thermal loss of the load 11 on heating. The inherent memory ability of the overload relays previously referred to also accounted for this loss thermally.

The following are representative values for some FIG. 1 elements: R2 = 4.7 megohms; C2 = 20 microfarads; R3 = 390 kilohms; R4 = 330 kilohms; R5 = 47 kilohms; R6 = 100 kilohms; R7 = 82 kilohms; R8 = 50 kilohms; R9 = 68 kilohms; R10 = 4.7 kilohms; R11 = 22 kilohms; R12 = 10 kilohms; R13 = 8.2 kilohms; C1 = 10 microfarads; Z1 = 5.6 volts; Z3 = 39 volts; and voltage on bus 15 = 40 volts positive. The behavior of the FIG. 1 indicator in response to various levels of current is described in the following paragraphs making reference to voltages at various points in the circuitry arising when these representative values are used.

On first starting the motor, the voltage on conductor 17 at point 18 will equal the voltage on bus 15, i.e. 40 volts positive, while the motor current in lines L1 through L3 and hence the voltage at point 20 will be the maximum negative voltage. This motor current should decrease to no more than the full load motor running current. With maximum negative voltage at point 20 both transistors Q1 and Q3 will be on and capacitor C2 will charge, thereby reducing the voltage at point 18. Since capacitor C2 will accumulate charge from previous current levels which did not cause the load to be disconnected, the voltage at point 18 will also be subject to the heat already stored in or the thermal capacitance of the motor as represented by that capacitor; it is in this manner that the electrical analog arrangement accounts for the electrical thermal loss of the motor load. If the current decreases properly and the motor starts, the voltage at point 18 will have fallen to about 15 volts and the voltage at point 20 will be about 2 volts, wherefore transistor Q3 will be off since zener diode Z1 is a 5.6 volt zener. With the voltage at point 19 being set at about 10 volts by adjusting the setting on resistor R12, diode D4 will be reverse biased and transistors Q4 through Q6, which are normally off, will stay off so that no signal will appear at terminal O. If the current does not decrease properly because the motor does not start, then the voltage at point 18 will fall below 10 volts since capacitor C2 will continue to charge through both transistors Q1 and Q3. When this happens diode D4 will be forward biased because of the 10 volts at point 19, wherefore transistors Q4 through Q6 will turn on and a signal will appear at terminal O.

Figure 2:
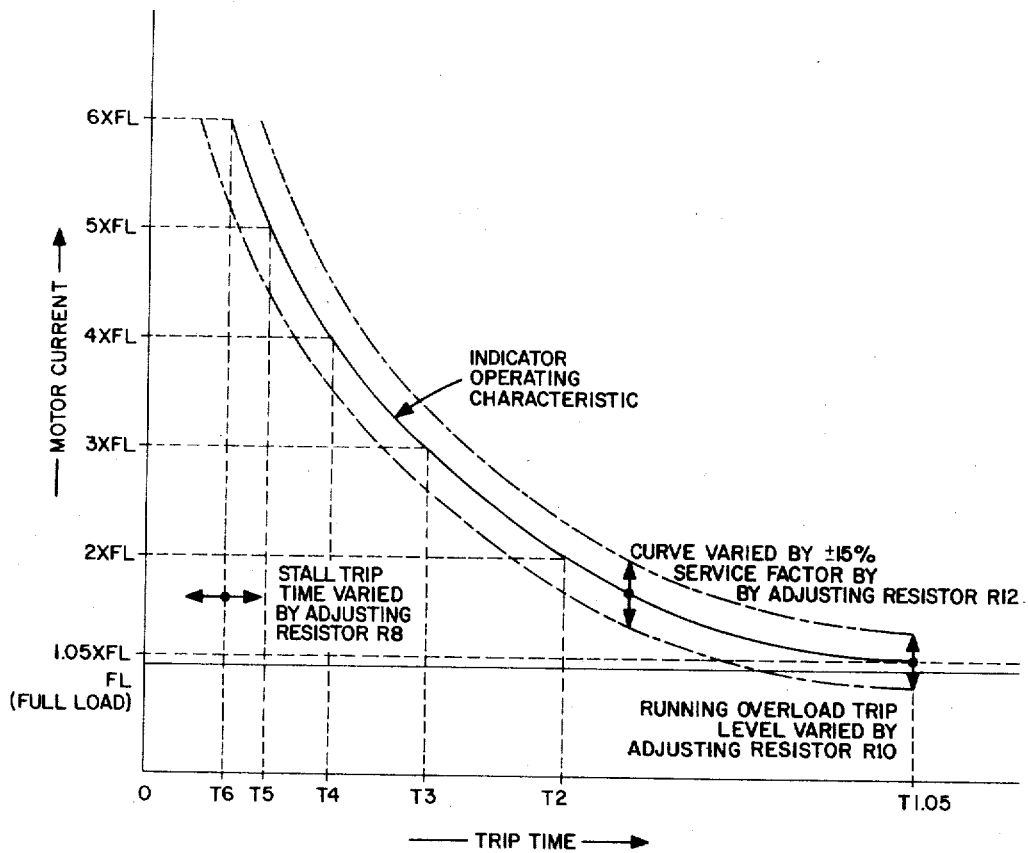
FIG. 2 is a simple graph illustrating the operating characteristic of the FIG. 1 indicator.
Figure 3:
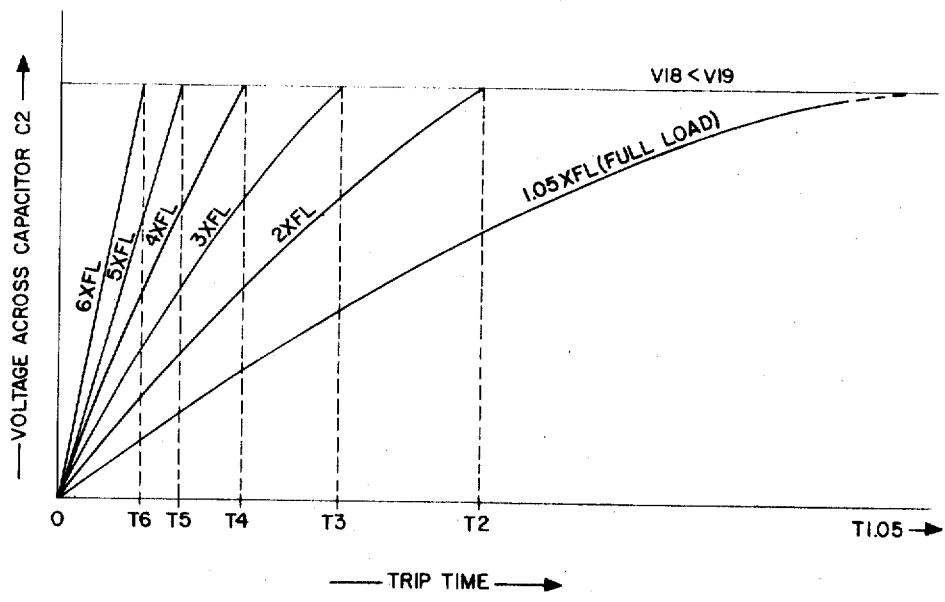
FIG. 3 is another graph showing the voltage rise across capacitor C2 in the FIG. 1 circuit for several values of motor current.

FIG. 3 shows how the voltage across capacitor C2 rises, for various values of fixed current, to a level identified as V18 = V19 (voltage at point 18 equals voltage at point 19) for which a signal will appear at terminal O as described above; the times T6, T5, T4, T3, T2 and T1.05 marked in that figure are thus the operating or trip times for the FIG. 1 indicator for the corresponding levels of current to the motor load. The FIG. 2 operating characteristic is simply a plot of these trip times and currents plus many more. Thus it can be seen that for 6 × FL (six times full load current), for example, the indicator will operate or produce a signal at terminal O in a time operiod O – T6 because at the end of that period the voltage at point 18 will be just slightly less than that at point 19; and as required, the indicator operating characteristic is an inverse curve. Under short cyclical overloads, however, due to the thermal analog arrangement of resistor R2 and capacitor C2 the indicator will operate according to the actual heat energy stored in the load, as has previously been mentioned.

If the motor does not start or stalls, a signal will appear at terminal O. Safe motor operation sets a maximum trip time for a certain stall current level so as to protect the motor in this situation then; the stall current level is commonly 6 × FL (or six times full load current). From FIG. 2 the corresponding stall overcurrent trip time is thus the time O – T6. Since motor full load currents vary as do stall trip times it is desirable to be able to preset the operating time interval O – T6 for six times full load current without destroying the continuity of the operating characteristic. In the FIG. 1 indicator interval O – T6 is preset simply by setting the wiper of resistor R8; hence the operating time can be easily preset for the stall current commonly quoted.

Safe motor operation also sets a maximum running current level so as to protect the motor from overload damage while it is running; the running overload level commonly chosen is 1.05FL (1.05 times full load motor current). From FIG. 2 again, the corresponding trip level shown should be adjustable to accommodate different motors and without destroying the operating characteristic. Presetting this commonly quoted running overload level is provided for by adjustable resistor R10.

The indicator thus far described is a simple-to-calibrate, no overshort, no lag, adjustable stall time and running overshoot trip level indicator which accounts for motor heating. It would be even simpler to calibrate if the running overload level and stall trip time could be preset independent of each other. This, then, is provided for by zener diode Z1, a 5.6 volt zener. With about 2 volts negative at point 20 when the motor is running, as mentioned earlier, transistor Q3 will be off since zener diode Z1 will be off and will stay off until, due to overcurrent of about 5.6/2 or 3.8 times full load current, it will turn on. Thus, at a running overload of only 1.05 times full load current, both Q3 and Z1 will be off so that the running overload trip level can be set by adjusting resistor R10 independently of where resistor R8 is set. However, at stall overload of 6 times full load current both Q3 and Z1 will be on so that the stall overload trip time can be set by adjusting resistor R8 without affecting the running overload trip time set. The voltage of zener diode Z1, then, is merely chosen so that it will turn off the second current valve for overloads less than some value of overload between the stall current at 6 × FL and the running current at 1.05 × FL, whereby both can be preset independently.

Also in FIG. 2, the indicator operating characteristic is shown varied by plus or minus 15 percent. Ideally, the operating characteristic should lie on the motor damage curve so as to enable using the motor to its fullest, yet without damaging it. In practice, however, it may be desired by the more daring user to drive the motor harder than recommended — i.e. set the indicator characteristic to the right of the motor damage curve — and by the more conservative user to overprotect it — i.e. set the characteristic to the left of the motor damage curve so that the motor is disconnected before the safe limits are reached. This variation in the protection characteristic has been illustrated as 15 percent in FIG. 2; the characteristic is varied within this 30 percent band in the FIG. 1 indicator by adjusting the setting at resistor R12, which in turn adjusts the particular voltage fixed at point 19.

In addition to those elements already described from the FIG. 1 indicator, zener diode Z2 and resistor R9 are provided for protecting the indicator from current surges while the power loss trip inhibit elements, previously mentioned, operate essentially as follows. When the voltage on buses 15 and 16 falls to zero (when their power source is turned off say) the voltage at point 18 will fall to zero while the voltage at point 19 will be propped up near 10 volts by capacitor C2. With V18 less than V19 a trip signal will appear at terminal O to open the breaker. This, of course, is undesirable, particularly if that power supply is simply turned off. However, with zener diode Z3 chosen at 39 volts, as soon as the voltage on the buses falls below 39 volts, transistor Q7 will turn off and thereby inhibiting transistor Q6 from producing the trip indication. The Applicants' copending Canadian application, Ser. No. 155,043, filed Oct. 26, 1972 and corresponding U.S. application, Ser. No. 362,048 filed May 21, 1973, Boothman and Nutt describes inhibit circuits of this general type in more detail.

Specifically, then, a novel static overload indicator for use in protecting a motor load has been disclosed. More generally, however, this invention provides an indicator whose operating characteristic more closely resembles the thermal damage curve for the load it is used to protect. In the case of a circuit breaker load, for example, where often only one operating time is desired to be accurately set, the second voltage-dependent current valve need merely be removed from the FIG. 1 indicator where it is used for that load. On the other hand, if it were desired to have three or more independently adjustable operating times in the operatiang characteristic of such a FIG. 1 indicator, one or more additional current valves need merely be parallel with those in the FIG. 1 indicator; all such modifications are believed and are intended to be apparent from the foregoing disclosure.

The embodiments of the invention in which an exclusive property or privilege is claimed are defined as follows:

1. For use in protecting a motor load connected to a power source, a static overload indicator having an inverse operating characteristic closely resembling the thermal damage curve for the motor and having operating times for stall and running overload level which can be preset independently of each other, said indicator comprising a pair of DC buses from another power source; a conductor; electrical analog means having resistance and capacitance means connected between one bus and said conductor and simulating the thermal characteristics of said motor for accounting for heat energy stored therein; means for producing a voltage proportional to the overload; voltage-sensitive indicating means connected to said conductor for producing an indication of a particular voltage thereon; and first and second voltage-dependent current valves each connected between said conductor and the other bus and to the voltage-producing means whereby the voltage on said conductor is a function of said motor current subject to the stored heat energy and equal to said particular voltage for each value of current after a time according to said characteristic has elapsed, said first and second current valve being adjustable for presetting said level and time for said running and stall overloads respectively and said second current valve assisting said first current valve only for overloads greater than some value of overload between said stall and running overloads so that the running overload level and stall overload time can be preset independently of each other.

2. For use in protecting a motor connected to a power source, a static overload indicator whose inverse operating characteristic closely resembles the thermal damage curve for the motor and operating times for stall and running overload can be preset independent of each other, said indicator comprising a pair of DC buses from another power source; a conductor; electrical analog means having resistance and capacitance means simulating the thermal resistance and capacitance of said motor for accounting for the heat energy stored in said motor and connected between one bus and said conductor; means for producing a voltage proportional to said overload; voltage-sensitive indicating means connected to said conductor for producing an indication of a particular voltage thereon; first and second voltage-dependent current valves each connected between said conductor and the other bus and to the voltage-producing means whereby the voltage on said conductor is a function of said motor current subject to the stored heat energy and equal to said particular voltage for each value of current after a time according to said characteristic has elapsed; first means for adjusting the voltage from the voltage-producing means to said current valves for presetting said level for said running overcurrent; second means for adjusting the voltage from the voltage-producing means to said second current valve for presetting said time for said stall overload; and means for tuning off said second current valve for overloads less than some value of overload between said stall and running overloads so that said operating times can be preset independently of each other.

3. The indicator as claimed in claim 2 wherein said electrical analog means includes a resistor in parallel with a capacitor, the resistor and capacitor representing said thermal resistance and capacitance respectively.

4. The indicator as claimed in claim 3 wherein said current valves are bipolar transistors.

5. The indicator as claimed in claim 3 wherein the means for turning off said second current valve is a zener diode.

6. The indicator as claimed in claim 2 wherein said particular voltage may be varied for varying said characteristic.

7. For use in protecting a load connected to a power source and having an inverse thermal damage curve, a static overload indicator whose operating characteristic closely resembles said curve and operating time can be preset for one value of overcurrent, said indicator comprising a pair of DC buses from another power source; a conductor; electrical analog means having resistance and capacitance means simulating the thermal characteristics of said load for accounting for heat energy stored in said load and connected between one bus and said conductor; means for producing a voltage proportional to the motor current; voltage-sensitive indicating means connected to said conductor for producing an indication of a particular voltage thereon; and a voltage-dependent current valve connected between said conductor and the other bus and to the voltage-producing means whereby the voltage on said conductor is a function of said motor current subject to the stored heat energy and equal to said particular voltage for each value of motor current after a time according to said characteristic has elapsed, said current value being adjustable for presetting said time for said one value of overload.

8. The indicator as claimed in claim 7 having another voltage-dependent current valve connected between said conductor and other bus and to the voltage-producing means and being adjustable for presetting the operating time for a second value of overload greater than said one value, said another current valve assisting the first current valve only for currents greater than some value of current between said one and second values so that the operating times can be preset independent of each other.

9. The indicator as claimed in claim 7 wherein said electrical analog means includes a resistor in parallel with a capacitor, the resistor and capacitor representing the thermal resistance and capacitance respectively of said load.

* * * * *